July 5, 1932.   H. S. VINCENT   1,865,547
LOCOMOTIVE VALVE MECHANISM
Filed March 22, 1929   9 Sheets-Sheet 1

INVENTOR
Harry S. Vincent
BY
ATTORNEYS

July 5, 1932.   H. S. VINCENT   1,865,547
LOCOMOTIVE VALVE MECHANISM
Filed March 22, 1929   9 Sheets-Sheet 2

INVENTOR
Harry S. Vincent
BY
ATTORNEYS

July 5, 1932.  H. S. VINCENT  1,865,547
LOCOMOTIVE VALVE MECHANISM
Filed March 22, 1929   9 Sheets-Sheet 6
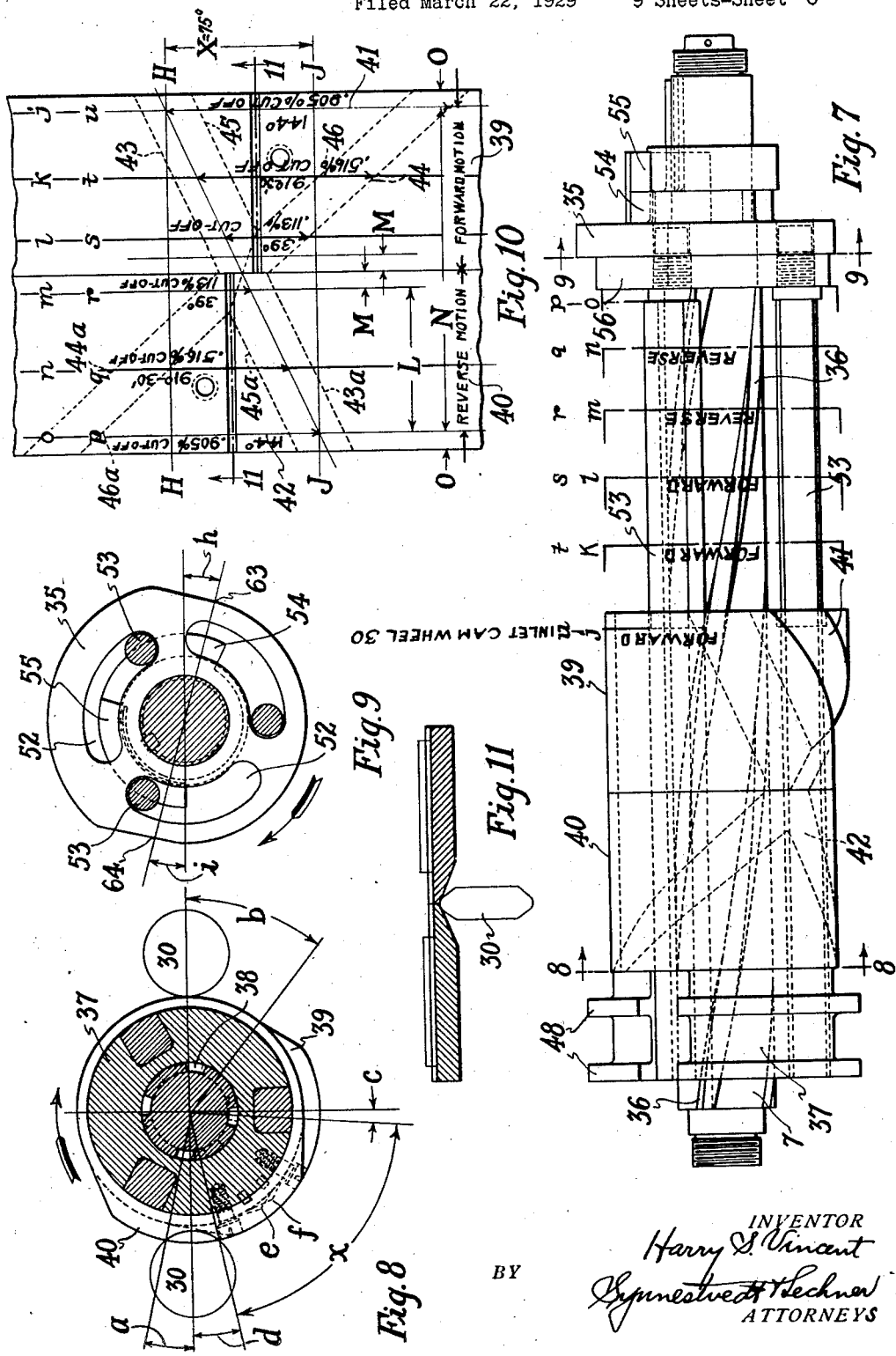
INVENTOR
Harry S. Vincent
BY
Synnestvedt & Lechner
ATTORNEYS July 5, 1932. H. S. VINCENT 1,865,547

LOCOMOTIVE VALVE MECHANISM

Filed March 22, 1929 9 Sheets-Sheet 7

July 5, 1932.  H. S. VINCENT  1,865,547
LOCOMOTIVE VALVE MECHANISM
Filed March 22, 1929  9 Sheets-Sheet 8
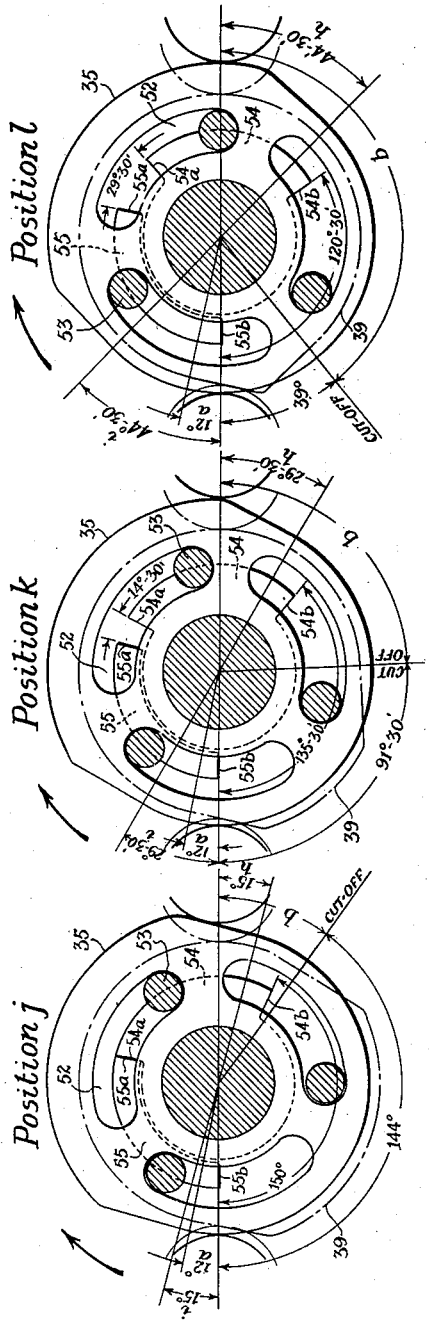
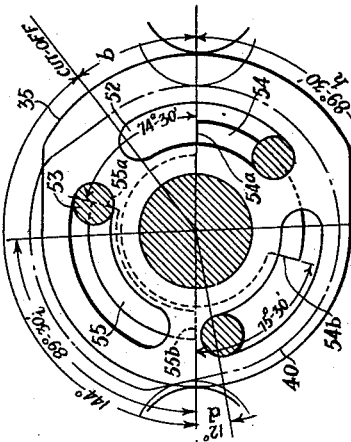
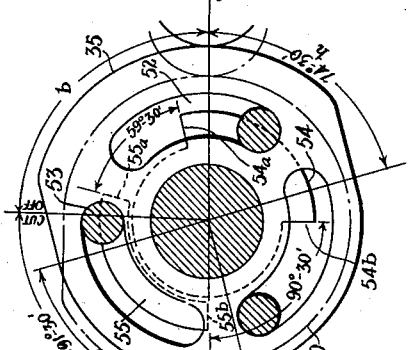
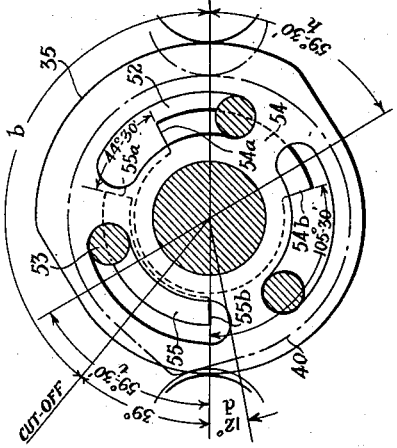
INVENTOR
Harry S. Vincent
BY
ATTORNEYS

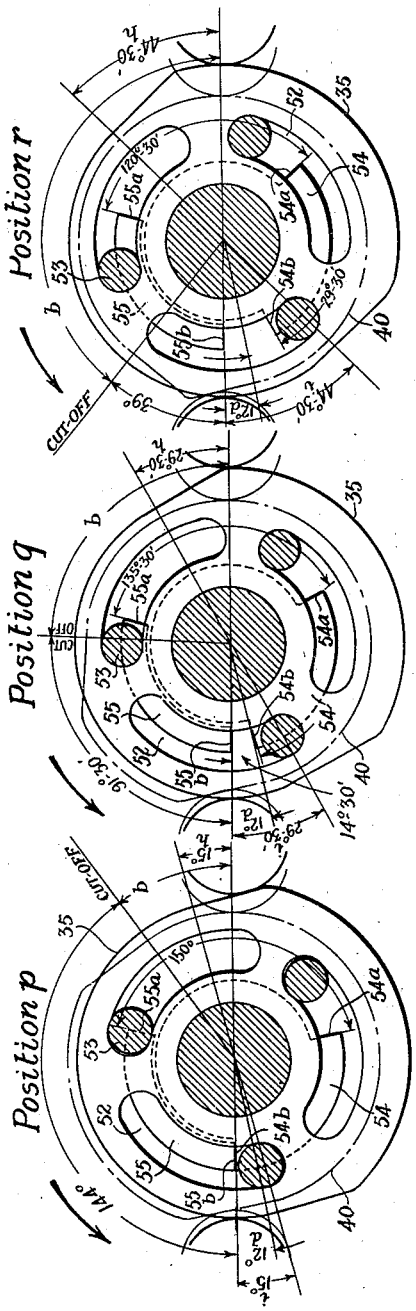
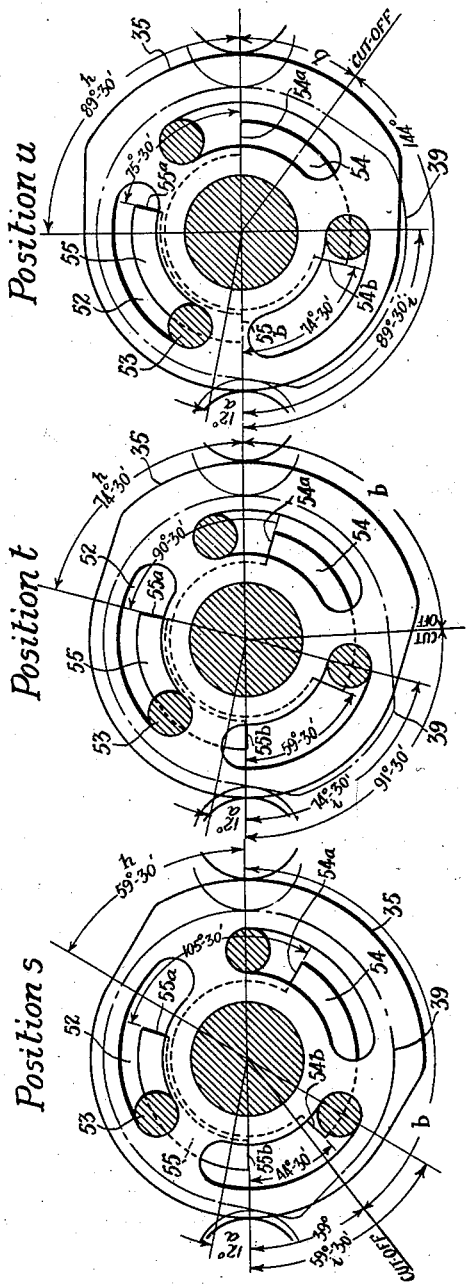

Patented July 5, 1932

1,865,547

UNITED STATES PATENT OFFICE

HARRY S. VINCENT, OF RIDGEWOOD, NEW JERSEY, ASSIGNOR TO FRANKLIN RAILWAY SUPPLY COMPANY, OF NEW YORK, N. Y., A CORPORATION OF DELAWARE

LOCOMOTIVE VALVE MECHANISM

Application filed March 22, 1929. Serial No. 349,074.

This invention relates to steam engine valve mechanism and is particularly applicable to locomotives.

Before proceeding to outline the principal objects and advantages of the invention, it is desired to refer briefly to some principles of steam engine operation, especially such as are involved where exhaust steam is used to create draft for the fire, as in a locomotive.

The theoretical ideal, of course, involves the use of the steam as expansively as possible and the exhaust thereof, with the development of as little back pressure as is possible. Practically, however, a certain amount of back pressure is necessary in order to create the proper draft, and the compression created after the exhaust valve closes must be of a value which is sufficiently high to adequately cushion the reciprocating parts, particularly at high speeds.

Therefore, it is attempted to provide for such a relation between cut-off, release and compression as will adequately take care of the draft and the cushioning of the reciprocating parts without, at the same time, absorbing too great a proportion of the power developed by the engine. For any given class of engine or for any given set of conditions under which any one engine may be called upon to operate, there is, of course, a theoretical ideal for cut-off, release and compression, and it is, therefore, clear that cut-off, release and compression are established by virtue of a compromise between them.

With present valve gears, however, especially the piston and slide valves so far almost universally adopted for locomotives, the most effective or ideal compromise between cut-off, release and compression cannot be very closely approached because the character of the driving mechanism for the valves is of a nature so inflexible as to make this impossible. For instance, any change in cut-off immediately effects a corresponding change in release and compression.

With my invention, however, it is possible to establish a different relation between cut-off on the one hand and release and compression on the other, and it is the principal object of my invention to provide an apparatus whereby it is possible for any given installation to approach as closely as may be desirable, the ideal relation between cut-off, release and compression.

I accomplish the foregoing object by means of an improved poppet type of valve mechanism for controlling the supply and exhaust of steam to and from the engine cylinders.

More specifically stated, my invention involves the provision of cam means for operating the inlet valves, which means are mounted for movement longitudinally of the cam shaft in order to alter the cut-off from maximum cut-off in forward motion to maximum cut-off in reverse motion, and to provide cam means for controlling the exhaust valves in such manner as to adjust their point of release and closure in proportion to the degree of cut-off obtaining for the inlet valves, so that release and closure will take place at a point in the stroke of the piston which is more nearly ideal than is possible with existing types of valve gears.

In this way I provide for sufficient compression to adequately cushion the reciprocating parts with the least possible loss of power. At the same time, my invention makes possible the selection of a release point which, while providing for maximum expansion, will still give ample opportunity for exhaust. This may vary with the particular service or type of locomotive, but for any given set of conditions, the ideal can be selected by experiment.

I also provide for a rotary motion of the inlet cam means with relation to the shaft upon which it is mounted, and I utilize this rotary motion to properly adjust the position of the cam which operates the exhaust valves.

In a locomotive it is a further object of my invention to provide a driving mechanism for the cam shaft which is connected to one of the driving axles.

The foregoing objects, together with such other objects as will appear hereinafter in connection with the description of the various parts of my invention, are obtained in the following manner, reference being had to the accompanying drawings which illustrate a preferred arrangement, and in which—

Figure 3:
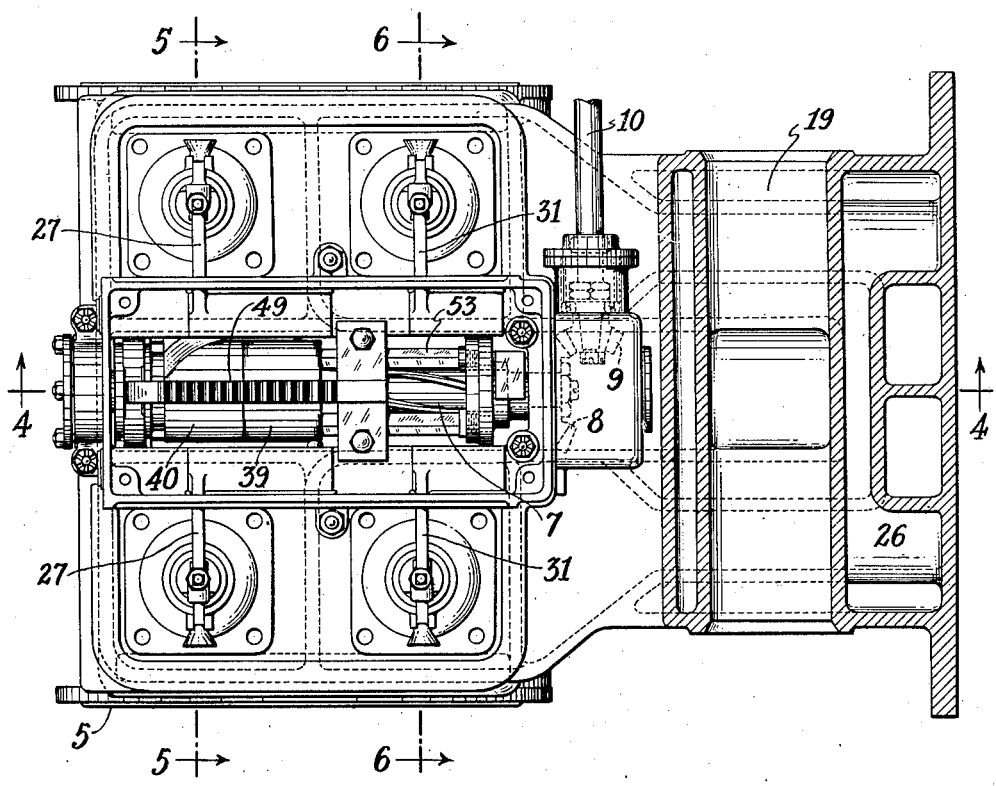
Fig. 3 is a plan section of the right hand cylinder of a locomotive approximately on the line 3—3 of Fig. 4 but with the cover of the valve chamber removed.
Figure 4:
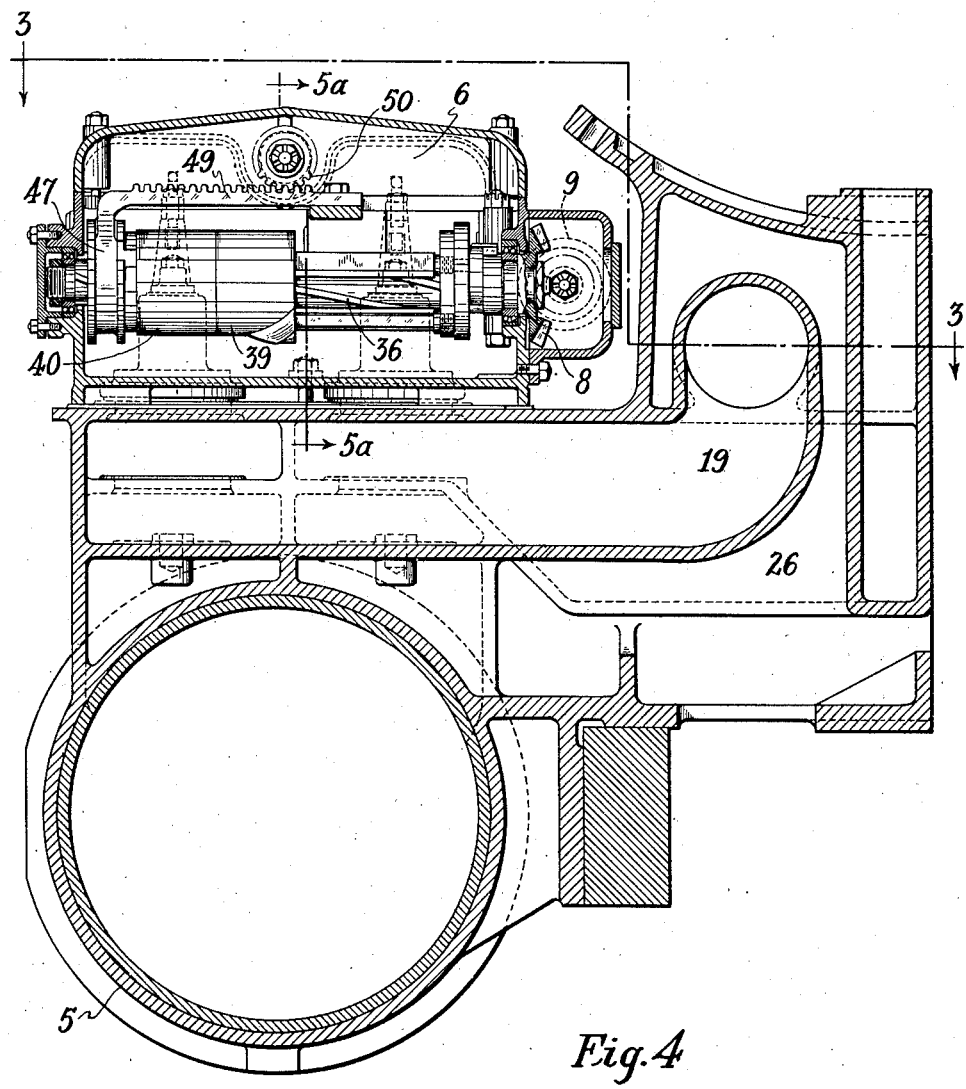
Fig. 4 is a vertical section substantially on the line 4—4 of Fig. 3.
Figure 5:
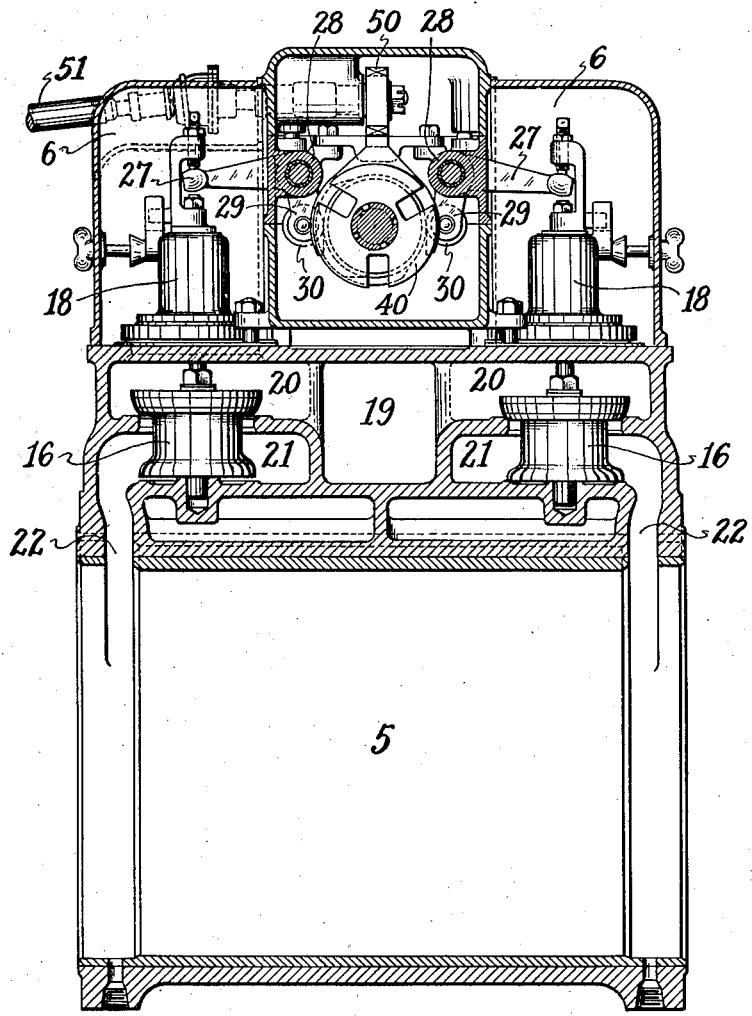

Fig. 5 is a section taken as indicated by the lines 5—5 and 5a—5a on Figs. 3 and 4 respectively.

Figure 6:
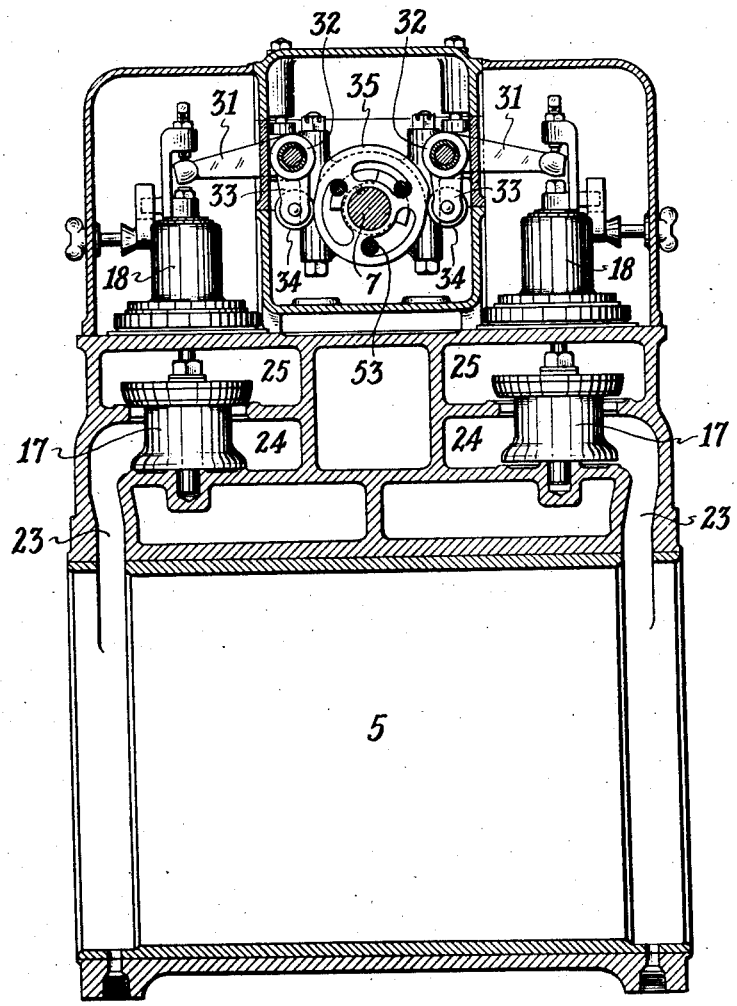

Fig. 6 is a section substantially on the line 6—6 of Fig. 3.

Fig. 7 is an enlarged view of the cam mechanisms in relation to the shaft upon which they are mounted and as viewed from the front of the right hand cylinder.

Fig. 8 is a section on the line 8—8 of Fig. 7.

Fig. 9 is a section on the line 9—9 of Fig. 7.

Fig. 10 is a view of the inlet cams as partially developed on a flat surface.

Fig. 11 is a section on the line 11—11 of Fig. 10.

Figure 12:
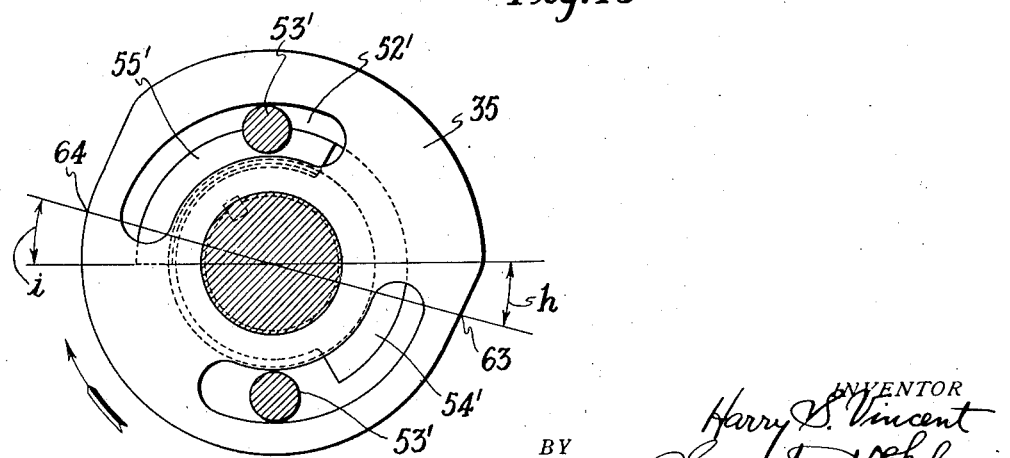

Fig. 12 is a sectional view similar to that of Fig. 9, but illustrating a modification in the driving connection between the inlet cams and the exhaust cam.

Figure 13:
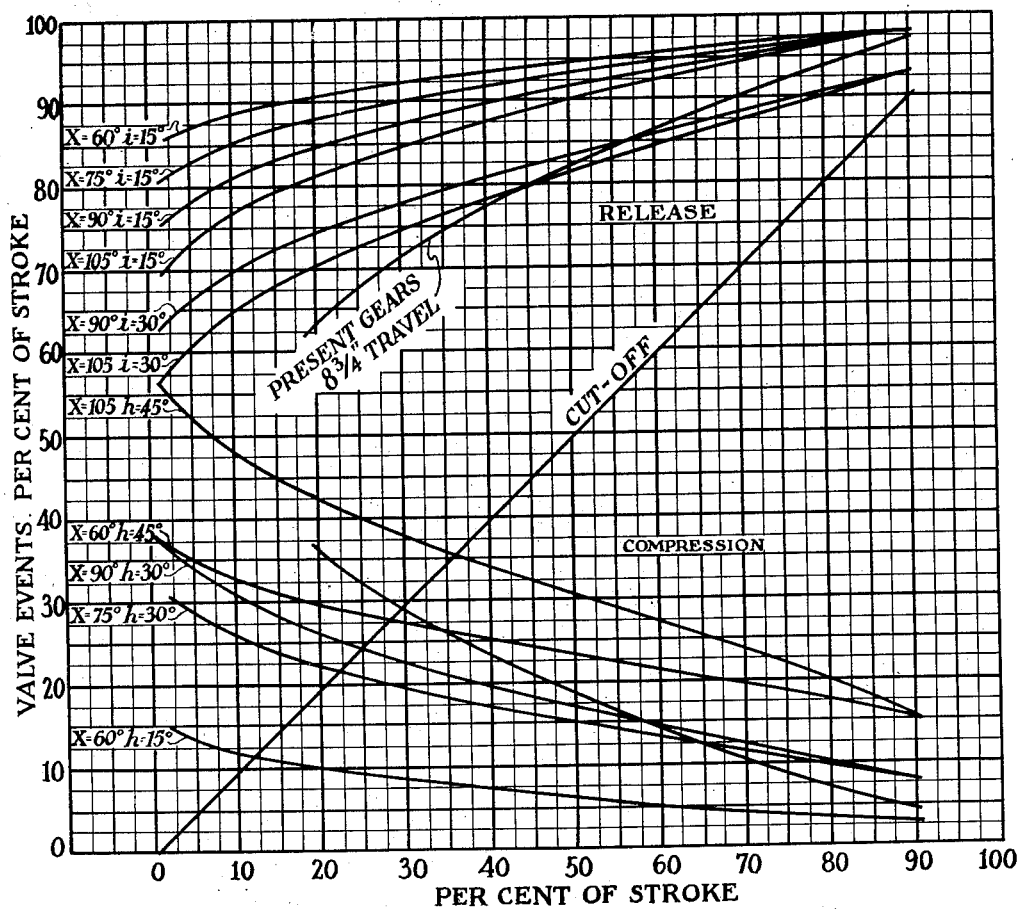

Fig. 13 is a graphical representation of the improved operation possible with applicant's invention as compared to that which is possible with present equipment.

Figures 14 to 25, inclusive, illustrate the positions of the cams at twelve progressive intervals including both forward and reverse motion as will appear.

Each cylinder 5 of the locomotive is provided with a valve chamber 6 through approximately the center of which runs a cam shaft 7 transversely of the locomotive.

The cam shafts are mounted in suitable bearings at each end and are driven through the medium of a bevel gear 8 on the inner end which meshes with a driving beveled pinion 9 on the shaft 10.

The parts 8, 9 and 10 are, of course, duplicated for each side of the locomotive and through the medium of other bevel gearing in the housings 11, 12 and 13 and the shafting 14, the cam shafts 7 are rotated from the driving axle 15. In order to prevent rotation of the driving shaft 14 around the axle, I provide the torque arm 65 which may be secured in any desired manner at one end to the housing 13 and at its opposite end to a fixed part of the locomotive, preferably by a flexible connection of some kind shown at 66. When operating in reverse there is a positive stop 67 for the torque arm.

The details of the parts 10 to 14 inclusive will not be shown or described in the present application, as they might take any one of a number of forms, and it is not desired to limit the present invention to any particular type.

There is an inlet valve 16 and an exhaust valve 17 for each end of each cylinder, which, in the present instance, are shown as of the type which is lifted against the incoming pressure through suitable mechanism 18, the details of which form no part of the present invention, and, therefore, will not be more fully described. It will be noted that the two inlet valves are on the outside of the cylinder and the two exhaust valves on the inside.

The live steam comes in through the passage 19 which divides into the two chambers 20, one over each inlet valve 16. When the inlet valves are raised from their seats, the steam flows down through the chamber 21 and passage 22 into the cylinder 5.

When the exhaust valves 17 are raised from their seats the exhaust steam passes from the cylinder 5 through the passages 23 and chambers 24 and 25, into the exhaust cavity 26.

The inlet valves 16 are opened by the horizontal arm 27 of the bell crank levers 28, the vertical arms 29 of which, carrying the rollers 30, are actuated by the cam mechanism to be described hereinafter.

The exhaust valves 17 are raised from their seats by the horizontal arms 31 of the bell crank levers 32, the vertical arms 33 of which, carrying the rollers 34, are actuated by the exhaust cam 35 to be described more fully hereinafter.

By referring more particularly to Figures 7 to 11 inclusive, it will be seen that the cam shaft 7 is provided with a plurality of helically disposed grooves 36, and that there is mounted upon the shaft what I term an inlet cam carrier 37. This carrier is provided with internal splines 38 adapted to fit into the grooves of the helix 36. The carrier is mounted for sliding movement longitudinally of the cam shaft, and it will be obvious that as such movement takes place, there will also be a rotary movement imparted to the carrier by virtue of the inter-action between the helix 36 and the splines 38.

Fixed upon the carrier 37 are the inlet cams 39 and 40, the former being for forward motion of the locomotive and the latter for reverse motion. The two cams, however, are identical in construction, as will appear, although they are arranged on the carrier in opposite directions. The actuating lobes 41 and 42 on the cams 39 and 40 are tapered, as will be best understood by referring to Fig. 10. The cams 39 and 40 are illustrated in Figs. 7 to 11 inclusive as being in the correct radial position to give lead to the back inlet valve, with the piston at the back end of the stroke and in the correct lateral position for maximum cut-off in forward motion.

In Fig. 10 the lead edge of the cam lobe 41 is shown at 43 and of the cam lobe 42 at 43a, and the cut-off edge of the cam lobe 41 is shown at 44 and for the cam lobe 42 at 44a. The lines 45, 45a, 46 and 46a represent the theoretical junction between the straight and curved portions of the cam lobes. The direction of the lines 44 and 44a depend, of course, upon the variation in cut-off desired.

As stated, the cam 39 with its lobe 41 governs the inlet valves for forward motion of the locomotive, while the cam 40, with its lobe 42, governs the inlet valves for reverse motion of the locomotive. In order to alter the cut-off it is necessary to move the carrier 37, upon which the cams 39 and 40 are mounted, longitudinally of the cam shaft 7. This is accomplished by means of the bifurcated arm 47 which fits between the flanges 48 on the carrier 37 and which has a horizontal extension in the shape of a rack 49. The teeth of the pinion 50 are adapted to mesh with this rack 49 and by rotating the pinion 50 through the medium of the shaft 51, it is possible to move the rack 49 with its arm 47 inwardly or outwardly toward or away from the center of the locomotive, and, at the same time, move the carrier 37 along the cam shaft 7 as already described. As the carrier is moved it will be rotated in a clockwise direction as indicated by the arrow in Fig. 8 during shortening of the cut-off in forward motion. Such rotation will progressively advance the lead edge 43 of the cam lobe 41 so as to cause the inlet valves to be opened at the proper time, and, as shown, with a constant lead, although this might be varied if desired. In the present disclosure the lead is maintained constant because the pitch of the lead edges 43 and 43a is the same as the pitch of the splines 38. Where a variable lead is desired the pitch of the lead edges 43 and 43a is made different from that of the splines 38. The tapered lead edges 43 and 43a make it possible to use a flatter angle for the cut-off edges 44 and 44a.

When the cam 39 has moved sufficiently far to the right to come out from under the wheels 30 of the inlet valve lever arms, such wheels 30 will be brought under the control of the cam 40 governing the inlet valves for reverse motion of the locomotive. Rotation of the cam shaft 7, of course, will then take place in the opposite direction so that the cam 40 must be placed upon the carrier 37 with its lead edge 43a on the opposite side.

During motion of the carrier 37 and the cams 39 and 40 mounted thereon from the position indicated in Fig. 7 (which is the position for maximum cut-off in forward motion of the locomotive) to the position farthest to the right hand side of Fig. 7 where the cam 40 will be in a position for maximum cut-off in reverse motion of the locomotive, the carrier, with its cams, will have rotated through the angle X as shown in Figs. 8 and 10.

I make use of this compound movement of the inlet cams 39 and 40 in order to properly adjust the exhaust cam 35, as will now appear. The exhaust cam 35 is loosely mounted upon the shaft 7 and is provided with a plurality of slots 52 (see particularly Fig. 9). Slidably extending through the carrier 37 are shifting rods 53 having their ends projecting into the slots 52.

When the parts are in the positions indicated in Figs. 7 to 9 inclusive, the ends of the shifting rods 53 are at substantially one end of the slots 52.

The exhaust cam 35 has a projecting lug 54 which lies in the path of the lug 55 fixedly secured to the shaft 7. In the positions shown the lug 55 will drive the lug 54 and consequently the exhaust cam 35. Just as soon, however, as any adjustment of the cam 35 takes place by virtue of movement of the carrier 37 and rods 53, such rods 53 will take against the ends of the slots 52 and rotate the cam 35 to a position corresponding to the rotation imparted to the inlet valves. The cam 35 will then be driven by the rods 53 and not by the lugs 54 and 55. In this way I am able to continuously reduce the release and closure for the exhaust valves from the maximum to the minimum cut-off.

It should be noted that the ends of the rods 53 are threaded into a spacer plate 56 adjacent the cam 35, said plate 56 acting as a reinforcement as well as a spacer or guide for the ends of the rods 53.

By the time that maximum cut-off for the inlet valves in reverse motion has become effective, namely, when the carrier 37 is in its extreme right hand position (opposite to that shown in Fig. 7), it will be seen that the faces of the lugs 54 and 55 which were previously in contact will have been moved apart an angular distance equal to the degree of rotation of the inlet cam carrier 37 and that their opposite faces will have approached each other an equal angular distance. If steam is now admitted to the cylinder the cam shaft 7 will rotate in a counter-clockwise direction, and as soon as the space between the lugs 54 and 55 has been taken up, their opposite faces will come into contact with each other and the exhaust cam 35 will be driven thereby in a counter-clockwise direction directly from the cam shaft 7.

The rods 53 will now be at the opposite ends of the slots 52 ready to adjust and drive the cam 35 upon a shortening of the cut-off of the inlet valves in reverse movement of the locomotive when return motion is imparted to the cam carrier 37 by the pinion 50 and rack 49.

Figure 1:
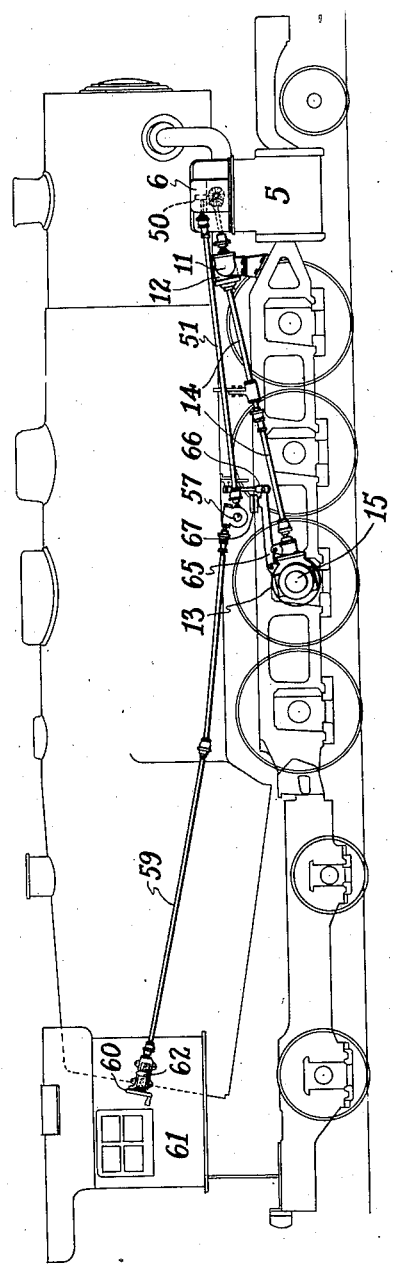
Fig. 1 is a diagrammatical side view of a locomotive with my improvements applied thereto.
Figure 2:
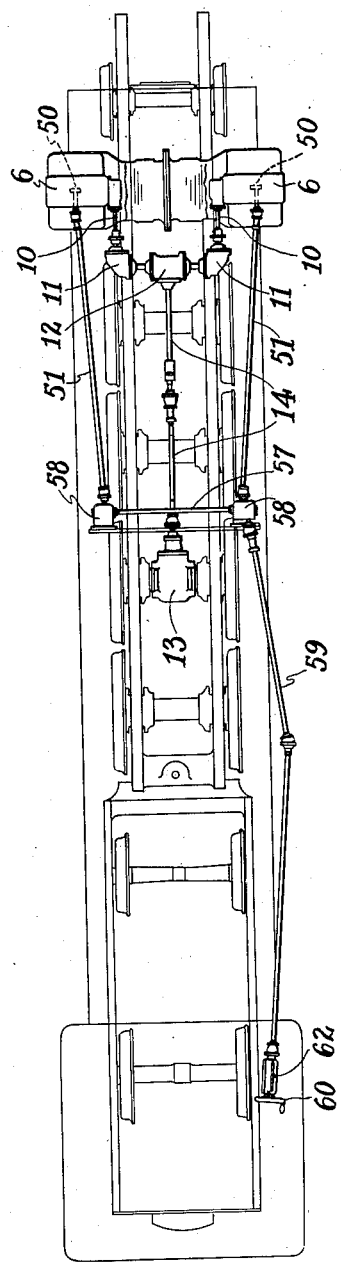
Fig. 2 is a plan view of the general layout as shown in Fig. 1, but with the boiler of the locomotive removed for the sake of clearness.

As previously described, the pinions 50 are driven by the shafts 51 which, in turn, can be connected by the shaft 57 and suitable gearing 58 (see Fig. 2). Manipulation of these parts can be effected through the shaft 59 which is driven by the hand wheel 60 conveniently located in the cab 61. An indicator 62 is suitably mounted adjacent the hand wheel 60 so as to give a reading of the cut-off.

As stated, with the parts in the position shown in Fig. 7, the piston is at the back end of its stroke and the cams are revolving in a clockwise direction as indicated by the arrow in Figs. 8 and 9. The cam 39 has reached its lead position, that is, the tangent point of the cam has passed the dead center the amount of the lead angle $a$. The cut-off point of this cam will then be $b$ degrees past the forward dead center.

At this time the reverse cam 40, which is a duplicate of 39, disposed in the opposite position upon the shaft 7, has its tangent or lead point for maximum cut-off $c$ degrees back of the bottom vertical center of the cam shaft 58. It will, therefore, be obvious that rotation of the cam 40 in the direction of the arrow through the angle X will bring its lead point to a position $d$ degrees below the back horizontal center, which is the correct lead angle when the cam shaft is revolving in a counter-clockwise direction (see Fig. 8).

In Fig. 10 where the inlet cams 39 and 40 are developed on a flat surface, the total cam travel between full cut-off forward and full cut-off reverse equals the distance N. The effective travel of each cam equals the distance L. The distance which the inlet cams travel between the minimum effective cut-off points equals 2M. The distance from the center of the cam wheels 30 to the edge of the cam in maximum cut-off position equals O.

The line H—H in Fig. 10 represents the back dead center of the cams in their normal position for maximum cut-off in forward motion, with the right piston at the back end of the stroke and with the cams revolving in clockwise direction as viewed from the outside of the right cylinder, and the line J—J represents the back dead center position of the cams after they have been revolved through the angle X to bring the reverse cam into its normal position for maximum cut-off with the piston at the back end of the stroke.

In the example shown, the maximum cut-off is at 90%, and where effective travel of the cam equals 4½ inches, the minimum cut-off is at 5% of the stroke. With this wide variation in cut-off it will be observed that the lines 45 and 46 and the lines 45a and 46a converge before the completion of the cam travel. In other words, at 5% cut-off the effective lift of the inlet valve is somewhat less than the maximum. In Fig. 8 the maximum lift of the cam at the minimum cut-off of 5% is indicated at the points, $e, f$.

It should be observed that I have shown the tangent point 63 where the exhaust cam 35 begins to open the exhaust valve for release in forward motion as being $h$ degrees below forward dead center and the tangent point 64 where closure of the exhaust valve takes place as being $i$ degrees above back dead center. For any given installation this, of course, will be fixed, but it will be seen that by a simple change in the angular position of the exhaust cam 35, the values of $h$ and $i$ can be easily changed which, of course, will result in an equivalent or corresponding change in the point of release and closure.

Great flexibility may be secured between the cut-off and exhaust phases by varying the value of the angle X and the angles $h$ and $i$. The effect of variation in these angles is shown graphically in Fig. 13 where the horizontal scale gives the percentage of piston stroke and the vertical scale the value of the valve events in percent of piston stroke. The upper curves represent various release phases and the lower curves the compression phases of exhaust valve operation all as clearly indicated by the legends on said figure.

In the construction of Figs. 1 to 11 inclusive, three driving rods 53 are illustrated, and, as shown in Fig. 9, these rods are located at or substantially at one end of the slots 52. With this construction the driving dogs 54 and 55 are in contact only when the locomotive is operating at maximum cut-off, either forward or reverse. In shorter cut-offs the exhaust cam 35 is driven by the shifting rods 53 so that the effect of this construction is a continuous reduction in release and closure from maximum to minimum cut-off.

In certain instances it may be deemed desirable to maintain the release and closure constant for a predetermined range of cut-off, beginning with the maximum, and, for this contingency, I provide the construction shown by Fig. 12. In this figure only two driving rods 53' are shown, instead of three, as in the other figures, and for the maximum cut-off position in forward motion which is illustrated in this Fig. 12, these rods are separated a short distance from the ends of the slots 52'. Therefore, the driving dog 55' will remain in driving contact with the cam ear 54' until the cam carrier 37 has been shifted laterally far enough to rotate the rods sufficiently so as to bring their ends into driving contact with the ends of the slots 52'. The length of the slots 52' can, of course, be made whatever value may be desired.

Furthermore, as already pointed out, the extent of exhaust release and closure may be further varied by changing the values of the angles $h$ and $i$, and in Fig. 12 these angles are shown as being substantially greater than in Fig. 9. The effect of a series of such changes with different values assumed for X, $h$ and $i$ is shown in the graph of Fig. 13, but it should be understood that a variation in angle X has no effect on cut-off, although it has a relatively great effect on release and closure.

I also desire to point out that the advantages incident to the construction shown in Fig. 12 can be realized to a certain extent with the construction of Figs. 1 to 11, although, where the three shifting rods 53 are used, it is not practicable to adopt a value of X much above 75 degrees, and where it is necessary or desirable to increase this angle, the shifting rods must be reduced in number as shown in Fig. 12, as otherwise there would be an inadequate amount of material left between the ends of the slots 52. Therefore, whenever it is found desirable to maintain a constant release and compression with a considerable variation in cut-off, this can be accomplished only by some such construction as is shown in Fig. 12.

A complete cycle of operations may be briefly summarized as follows: With the right hand piston of the locomotive in the back end of the cylinder and with the cams in the position shown in Figs. 7 to 9, inclusive, the mechanism will be set for maximum cut-off in forward motion of the locomotive. As the steam is admitted and the locomotive gets under way, the cut-off, in accordance with well known principles, will have to be shortened. This is accomplished by rotating the hand wheel 60 so as to move the cam carrier 37 to the right upon the helix 36. This will rotate the inlet cams, and with them the exhaust cam, so as to give an earlier release and closure of the exhaust valves and progressively place the lead edge of the forward motion inlet cam in correct position for any given cut-off. This motion can continue all the way down to minimum cut-off. If the locomotive is stopped and is to be reversed, the cam carrier 37 is moved to its extreme right hand position, from which position it can be moved to the left by means of the hand wheel 60 in order to shorten the cut-off in reverse motion of the locomotive. The movement of the exhaust cam 35 will again correspond as already described by virtue of the inter-action between the shifting rods 53 and the slots 52 in the exhaust cam 35.

Figures 14 to 25, inclusive, illustrate a specific example and show, respectively, twelve progressive positions of the cams indicated by the reference characters $j$, $k$, $l$, $m$, $n$, $o$, $p$, $q$, $r$, $s$, $t$, and $u$ in Figures 7 and 10.

In position $j$, the cams are set for full gear forward motion and when viewed from the left hand end of shaft 7 for the right hand cylinder they will rotate in a clock-wise direction.

In this example it has been assumed that the angle $x=75°$, that is, the angle of the splines 38 is such as to cause the inlet cams 39 and 40 to rotate on the shaft 7, through an arc of 75°, in passing from position $j$ to position O, Figures 7 and 10.

Figure 14 illustrates the relative angular position of the inlet cam 39 and exhaust cam 35 in position $j$. The lug 55 integral with shaft 7 and the lug 54 integral with cam 35 have their faces 54a and 55a in contact, the opposite faces 54b and 55b being separated an angular distance of 150°. The rods 53 are in the forward ends of slots 52 but not in driving contact. In this position clockwise rotation of the shaft 7 will cause lug 55 to drive lug 54 and the cam 35 to which it is attached. Cut-off will occur when the cam 39 has rotated 144° and will equal about 90.5% of the piston stroke. The closure edge of the exhaust cam 35 has passed the back dead center 15° and the release edge of the cam has passed below the forward dead center an equal angular distance.

Figure 15 shows the relation of the cams 39 and 35 after cams 39 and 40 have been moved along shaft 7 to position $k$ and have rotated in relation to shaft 7 through an angle of 15°. In rotating cam 39 the first movement brings the rods 53 in contact with the ends of slots 52. These are separated by an angular distance assumed to equal 30' of arc and any further movement separates the surfaces 54a and 55a. Thereafter the cam 35 is driven by the rods 53 and not by the lug 55.

By this construction I vary the angular distances $h$ and $i$ in proportion to the variation in the cut-off. I may, however, as shown by Figure 12, extend the slots 52 so that the exhaust cam 35 will be driven by the lug 55 for a longer period, thereby maintaining a constant value for the angles $h$ and $i$ until the cam 39 reaches a position to bring the rods 53 into contact with the ends of slots 52, after which cam 35 will again be driven by the rods 53, and the angles $h$ and $i$ will become variable.

In the position $k$ shown by Figure 15, the face 54a has advanced an angular distance from 55a of 14°—30'. The angles $h$ and $i$ therefore equal 29°—30' and the cut-off occurs after cam 39 has rotated 91°—30', equaling a cut-off of 51.6 percent of the piston stroke.

Figure 16 indicates the angular relations of cams 39 and 35, after the cams 39 and 40 have been moved laterally on shaft 7 to position $l$, and have rotated in relation to shaft 7 through an angle of 30°. In this position the angles $h$ and $i$ equal 44°—30', and the cut-off occurs when cam 39 has rotated through an angle of 39°, giving a cut-off of approximately 11.3 percent of the piston stroke.

In Figure 17, the cams 39 and 40 have been moved laterally on shaft 7 to position $m$ and have rotated in relation to shaft 7 an angular distance of 45°. By referring to Figure 10, it will be seen that reverse cam 40 is now in position to control the valve events; consequently the lead edge 43a of the cam 40 is below the horizontal center line of the cam and in the correct position to give the required lead when the shaft 7 begins rotation in a counter-clockwise direction.

In Figures 17, 18 and 19, it is assumed for convenience that the locomotive is stationary during the shifting of the cut-off and that the throttle is not opened until position *o* has been attained.

In Figure 17 the angles *h* and *i* equal 59°–30′ and the cut-off angle equals 39° in reverse. The faces 54a and 55a are now 44°–30′ apart and the faces 54b and 55b are 105°–30′ apart.

In Figure 18 the cams 39 and 40 have been moved laterally to position *n* and have rotated in relation to shaft 7 through an angle of 60°. The angles *h* and *i* equal 74°–30′ and the cut-off angle equals 91°–30′ in reverse.

Figure 19 shows the cams 39 and 40 moved laterally to position *o* which is the maximum amount of movement. In this position the inlet cams have rotated through the full angle *x*, or 75°, and the cam 40 is in the position of full gear cut-off in reverse. The angles *h* and *i* equal 89°–30′ and the faces 54a and 55a have moved apart an angular distance of 74°–30′, the opposite faces 55b and 54b being 75°–30′ apart.

The cams 40 and 35 shown in Figure 19 govern steam distribution on the right side of the locomotive. On the left side, the cams are similar but advanced in a counter-clockwise direction through an angle of 90°. The left inlet valve is therefore fully open. If the throttle is now opened, shaft 7 will begin to revolve in a counter-clockwise direction under the influence of the left piston, the revolution of shaft 7 will rotate the lug 55 until its free face 55b will contact with the face 54b and lug 54. The release edge of the cam 35 will then become the compression edge in reverse and vice versa—the angles *h* and *i* will be the same as shown in Figure 14 but reversed, the relation between cams 40 and 35 then being as shown in Figures 20 and as represented by the position *p* in Figures 7 and 10. The rods 53 will now be near the opposite ends of slots 52, being separated by an angular distance of 30′.

In Figure 21, the cams 39 and 40 have been moved laterally in a left hand direction to position *q*, and have rotated in relation to shaft 7 through an angle of 15° in a counter-clockwise direction. The cut-off angle is 91°–30′, equivalent to a cut-off of 51.6% of the piston stroke. The angles *h* and *i* equal 29°–30′.

In Figure 22, the cams 39 and 40 have been moved back laterally from position *q* to position *r*, and the inlet cams have rotated through an angle of 30° from position *p*, the locomotive in reverse with a cut-off equal to 11.3% of the piston stroke. All other angular distances have advanced 15° in a counter-clockwise direction.

In Figure 23, representing position *s*, of the inlet cams 39 and 40, the cams have rotated through an angle of 45° from position *p* and the forward motion cam 39 is again brought into position to control the inlet valve. The cut-off angle is 39° and all other positions have advanced through an angle of 15°. In Figures 23, 24 and 25, it is again assumed that the locomotive is stationary.

In Figure 24 the inlet cams have been moved laterally to position *t*, and have been rotated through an angle of 60° in relation to shaft 7. The cut-off angle is 91°–30′ equivalent to a cut-off of 51.6%, and all other positions have advanced 15° from position *s*.

In Figure 25, cams 39 and 40 have been moved laterally to position *u* and have rotated in relation to shaft 7 through the angle *x* from position *p*. The inlet cam 39 is in position for the maximum cut-off of 90.5%. When the throttle is opened, admitting steam to the left cylinder, shaft 7 will begin to rotate in a clockwise direction, bringing the face 55a into contact with the face 54a, thereby placing the inlet cam 39 and the exhaust cam 35 in their proper relation for forward motion, and when both of the cams 39 and 35 have moved through an angle of 285° the relation shown in Figure 14 will be restored. This movement also places the rods 53 in the forward ends of slots 52 in the relation shown by Figure 14.

I claim:—

1. In mechanism for controlling the supply of steam to an engine cylinder, the combination of an inlet valve for each end of the cylinder, an exhaust valve for each end of the cylinder, a cam shaft, a cam on said shaft for controlling the opening and closing of said exhaust valves, cam means on said shaft for controlling the opening and closing of said inlet valves, said cam means having tapered lobes, means for sliding said cam means along the shaft to change the cut-off of said inlet valves from maximum cut-off in forward motion to maximum cut-off in reverse motion and vice versa, means for rotating said cam means on the shaft during said sliding movement and means for rotatively adjusting the exhaust cam as said inlet cam means is moved.

2. A poppet valve construction for an engine cylinder comprising, in combination, an inlet valve for each end of the cylinder, an exhaust valve for each end of the cylinder, a cam shaft, an exhaust cam on said shaft, inlet cam means on said shaft, means for sliding said inlet cam means along the shaft to alter the cut-off, means for rotating said inlet cam means on the shaft during said sliding movement, and means for rotatively adjusting the exhaust cam as said inlet cam means is moved.

3. In mechanism for controlling the supply of steam to an engine cylinder, the combination of an inlet valve for each end of the cylinder, an exhaust valve for each end of the cylinder, a cam shaft, cam carrying means slidably mounted on said cam shaft, means for rotating said cam carrying means on said cam shaft upon sliding movement thereof longitudinally of the shaft, cam means for actuating the inlet valves mounted upon said carrying means, a cam for actuating said exhaust valves mounted upon the cam shaft, and means cooperating with said carrying means for rotating the exhaust cam as the carrying means is moved.

4. A poppet valve construction for an engine cylinder comprising, in combination, an inlet valve for each end of the cylinder, an exhaust valve for each end of the cylinder, a cam shaft, a cam on said shaft for controlling the opening and closing of said exhaust valves, a cam carrying member mounted upon said cam shaft for both longitudinal and rotative motion with respect thereto, cam means on said carrier for controlling the opening and closing of said inlet valves, said cam means having tapered lobes, means for sliding said carrier along said shaft to change the cut-off of said inlet valves from maximum cut-off in forward motion to maximum cut-off in reverse motion and vice versa, means connecting the carrier with the cam for the exhaust valves, and means for causing a rotation of said carrier with its inlet cams and of said exhaust cam as said carrier is moved longitudinally of the cam shaft.

5. Cam operating means of the character described comprising, in combination, a cam shaft, a cam carrier helically mounted thereon, inlet cam means carried thereby, exhaust cam means carried on the shaft and means connecting said carrier and said exhaust cam means for rotatively adjusting the exhaust cam means upon movement of said carrier along the helix.

6. Cam operating means of the character described comprising, in combination, a cam shaft, a cam carrier helically mounted thereon, an exhaust cam loosely mounted on the shaft, inlet cams mounted on said carrier, said inlet cams having tapered lobes for adjusting the cut-off of the inlet valves from maximum cut-off in forward motion to maximum cut-off in reverse motion and vice versa, means for moving said carrier along the helix, means for driving said exhaust cam directly from said shaft when said inlet cam carrying means is in either of its maximum cut-off positions, and means connecting said carrier to said exhaust cam for rotatively adjusting the latter on the cam shaft as the carrier moves along the helix from either of its maximum cut-off positions and for driving said exhaust cam in said adjusted positions.

7. Cam operating means of the character described comprising, in combination, a cam shaft, an exhaust cam loosely mounted on the shaft, inlet cam means helically mounted on the shaft, disengageable means for driving the exhaust cam directly from the shaft, and means connecting the inlet cam means with the exhaust cam means, said connecting means being adapted to adjust the exhaust cam as the inlet cam means moves along the helix and also to drive the exhaust cam upon disengagement of said direct driving connection from the shaft.

8. Cam operating means of the character described comprising, in combination, a cam shaft, an exhaust cam loosely mounted on the shaft, an inlet cam for forward motion and an inlet cam for reverse motion, said inlet cams having tapered lobes with the narrow portions in alignment and adjacent each other and both of said inlet cams being helically mounted upon the cam shaft, means for moving the inlet cams along the helix from maximum cut-off in forward motion to maximum cut-off in reverse motion, means connecting the inlet cams with the exhaust cam, said connecting means being adapted to adjust and drive said exhaust cam in proper relation to said inlet cams.

9. The combination of a locomotive cylinder, an inlet valve, an exhaust valve, a cam shaft, an exhaust cam loosely mounted on the cam shaft, means for driving said exhaust cam directly from the shaft, an inlet cam helically mounted on the shaft, means for moving the inlet cam along the helix to adjust the cut-off, and means connecting the inlet cam to the exhaust cam, said means being adapted to adjust the exhaust cam as the inlet cam turns on the helix as well as to drive the exhaust cam in positions of adjustment.

10. Cam operating means of the character described comprising, in combination, a cam shaft, inlet cam means helically mounted thereon, exhaust cam means rotatively mounted on the shaft, and means connecting said inlet cam means for rotatively adjusting the exhaust cam means upon movement of said carrier along the helix.

11. Cam operating means of the character described comprising, in combination, a cam shaft, inlet cam means helically mounted thereon, exhaust cam means rotatively mounted on the shaft, and means operated by said inlet cam means for rotatively adjusting the exhaust cam in a nonsynchronous relation to the cut-off of the inlet cam.

In testimony whereof I have hereunto signed my name.

HARRY S. VINCENT.